Nov. 9, 1937.  F. C. BAIRD  2,098,481
BRAKE CONTROL
Filed Aug. 22, 1934  2 Sheets-Sheet 1
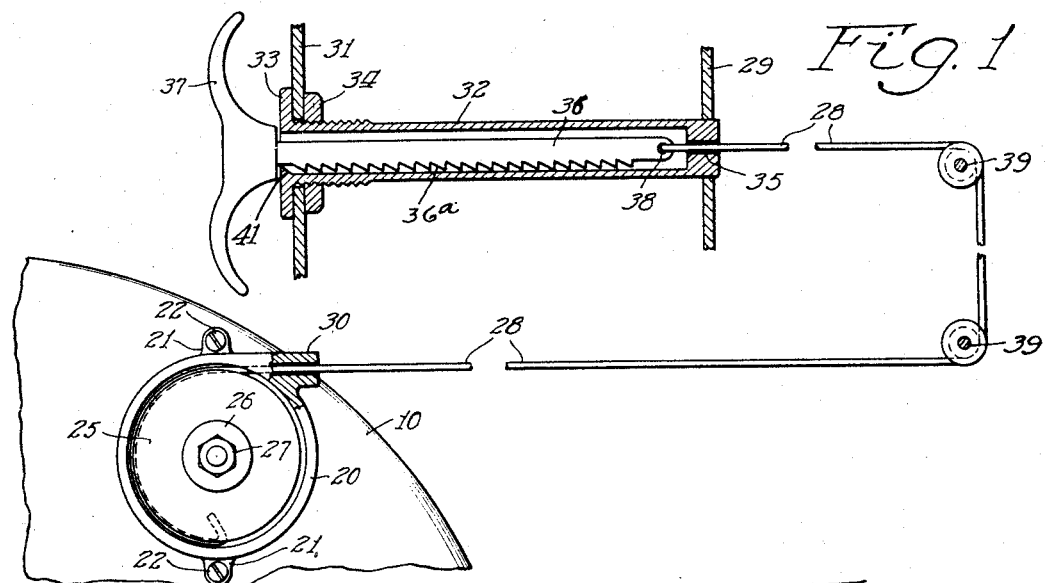
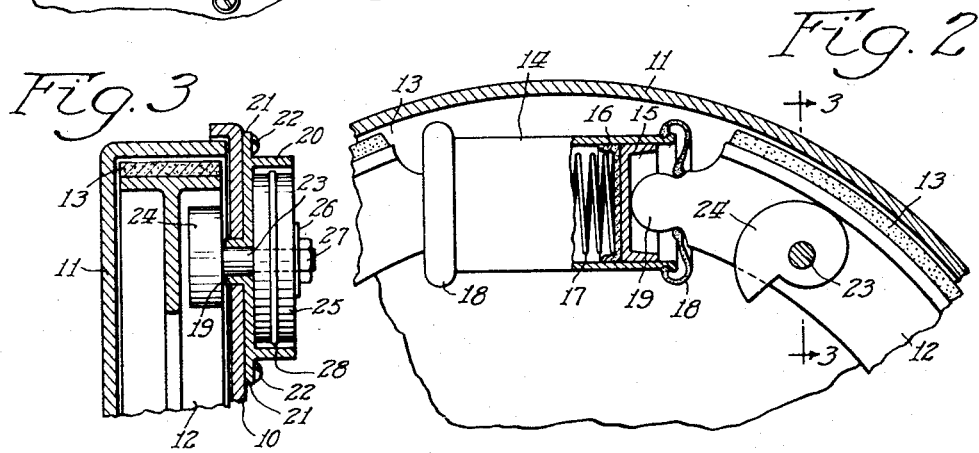
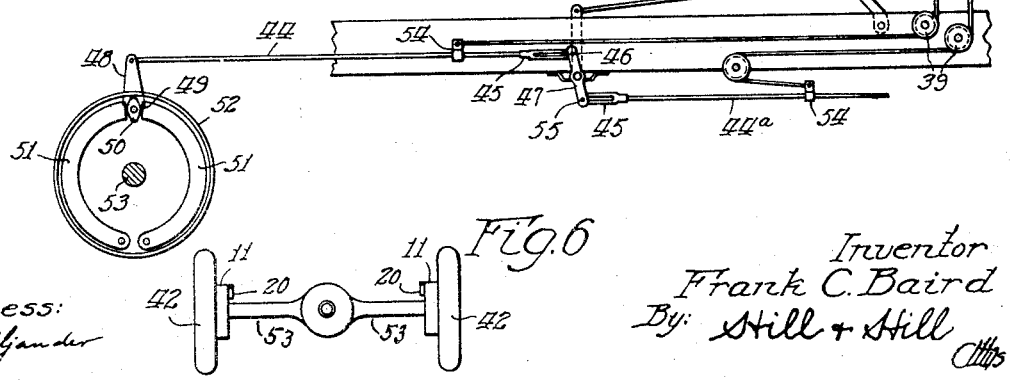
Witness:
V. Siljander
Inventor
Frank C. Baird
By: Hill + Hill Nov. 9, 1937. F. C. BAIRD 2,098,481
BRAKE CONTROL
Filed Aug. 22, 1934 2 Sheets-Sheet 2
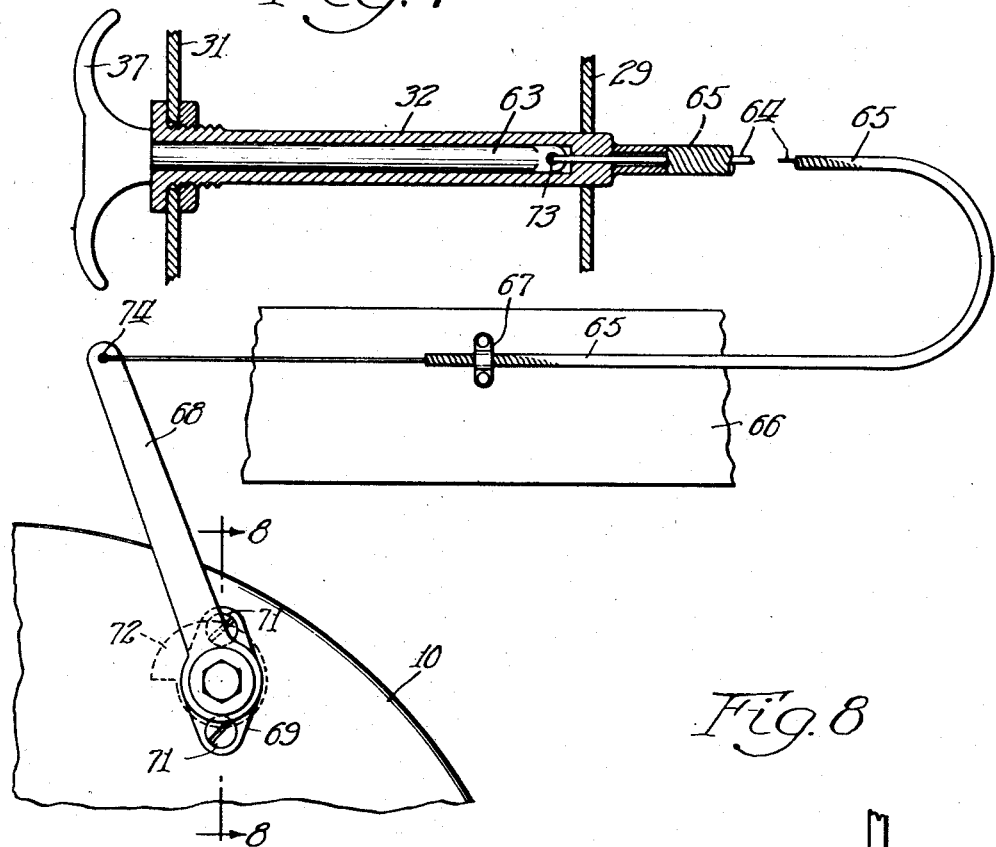
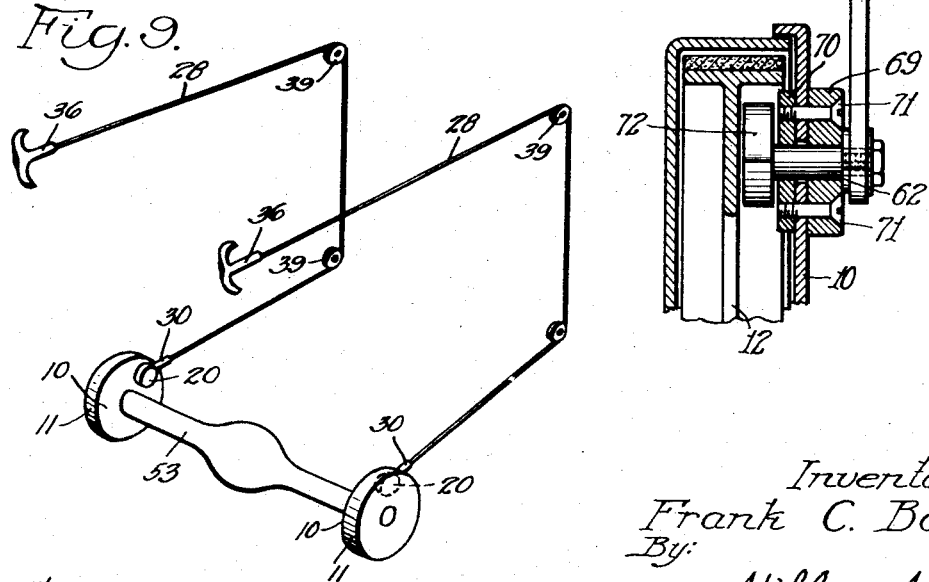
Inventor:
Frank C. Baird
By: Hill + Hill
Attys.
Witness:
V. Siljander Patented Nov. 9, 1937

2,098,481

UNITED STATES PATENT OFFICE 2,098,481

BRAKE CONTROL

Frank C. Baird, Detroit, Mich.

Application August 22, 1934, Serial No. 740,979

2 Claims. (Cl. 188—16)

My invention relates to brake control devices and more particularly it relates to means for manipulating individual brakes used to control the driven wheels of automobiles or the like.

It is well known that automobiles are usually equipped with an individual brake for each driven rear wheel and that a single or master control means actuated by a pedal or lever is provided for simultaneously moving the brakes into and out of operative relation with the respective individual wheels controlled thereby. The tendency of the driven wheels of an automobile to spin in muddy and slippery places, and the difficulty of starting a car which has become stalled by reason of the spinning of the wheels is well known. The application of the brakes uniformly to both the driven wheels at such a time is of little or no aid in starting the car since all that is accomplished thereby is an increased resistance to operation of the engine. It is found, however, that if the spinning of one or both of the individual wheels is checked or stopped entirely by the independent application of the brakes respectively controlling the spinning wheels, the other driven wheel will operate to actuate the car to a point where the soil or road bed offers sufficient tractive resistance to prevent further spinning of the wheels when the brakes are released.

The invention has as one of its objects the provision of improved means for checking or stopping the spinning or driven wheels of automobiles.

Another object is the provision of separate control means each operatively related to the brake of a different driven wheel of an automobile, whereby spinning of either driven wheel may be checked or stopped without movement of the brake controlling the other driven wheel.

Another object of the invention is the provision of improved brake apparatus for automobiles whereby a plurality of simultaneously operable brakes are also adapted for individual operation to control or prevent spinning of the wheels with which said brakes are operatively connected.

A further object of the invention is the provision of improved means adapted for manipulation to prevent or control the spinning of driven automobile wheels wherever found necessary.

Still another object of the invention is the provision of improved brake apparatus for driven wheels adapted to prevent spinning thereof, which is simple, easily installed, and satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

Referring now to the drawings, Fig. 1 is a view, partially in section, of one embodiment of the invention shown as installed on an automobile in a manner whereby it is adapted to control the operation of one of a plurality of brakes with which it is connected, and is operable to prevent spinning of the driven wheel with which such brake is operatively related;

Fig. 2 is a fragmentary view of a portion of a standard brake mechanism with which the device is operatively connected;

Fig. 3 is a view along the lines 3—3 of Fig. 2;

Fig. 4 is a diagrammatic view of another embodiment of the principles of the invention shown as mounted on an automobile in a manner whereby its actuation controls the operation of one of a plurality of mechanical brakes with which it is connected, and is operable to prevent spinning of the driven wheel with which such brake is operatively related;

Fig. 5 is a view of a portion of the instrument panel of an automobile equipped with a plurality of the devices embodying the invention;

Fig. 6 is a diagrammatic view of a pair of driven wheels of an automobile and brake means therefor, each having one of the devices of the invention operatively connected therewith;

Fig. 7 illustrates another device embodying the principles of the invention;

Fig. 8 is a view along the line 8—8 of Fig. 7; and

Fig. 9 is a diagrammatic view of the device embodying the invention.

Referring now more particularly to the drawings, one form of the device embodying the principles of the invention is illustrated in Fig. 1 as operatively connected with a hydraulic brake mechanism for automobiles, the latter being shown fragmentarily and adapted to control one of the driven wheels 42 shown diagrammatically in Fig. 6. The brake mechanism comprises a supporting member 10 mounted on an axle 53 and includes a brake drum 11 and a pair of shoes 12, each of the shoes being provided at its lower end with a pivotal support (not shown). The shoes 12 each have a lining 13 and are adapted to be moved into operative engagement with the drum 11 by hydraulic pressure utilized in a well known manner in a cylinder body 14 containing pistons 15, piston cups 16 and an expansible spring 17. The upper ends of the shoes 12 provide knobs 18 which bear against the pistons 15 and are thereby actuated by the pistons. Outward movement of the pistons 15 actuates the shoes 12 to operatively engage the linings 13 with the drum 14. A pair of boots 18 preferably constructed of fibrous material, close the open ends of the cylinder body 14 and yield to permit movement of the brake shoes 12. The brake devices for the individual driven wheels are simultaneously actuated by a foot pedal 40 accessible from the driver's seat as shown in Fig. 4. Further detailed showing or description of the automobile, its brake devices and control means therefor is omitted, the same being well known and unnecessary to an understanding of the invention which consists in the provision of means for actuating an individual brake shoe independently of hydraulic pressure or mechanically actuated means manually used in actuating the brakes.

The invention resides in a control device manually operable from the driver's seat, there being preferably as many of said devices provided as there are driven wheels and cooperating brake mechanisms. Each individually controlled device comprises a cup-shaped housing 20 mounted on the support 10 and fastened by screws 22 extending through lugs 21. A pulley 25, positioned in the housing 20, is mounted on a shaft 23 and held in position by a washer 26 and a nut 27. The shaft 23 is journalled in the housing 20 and projects through the support 10 to provide a mounting for a cam 24 in such a manner that the cam is normally out of engagement with the adjacent shoe 12 and adapted to be moved into operative engagement with the shoe upon rotation of the pulley 25. The pulley 25 is rotated by a cable 28 having one end wrapped about the shoe and threaded through an aperture in a member 30 projecting tangentially from the housing 20. The cable 28 extends about a pair of pulleys 33, mounted in any suitable manner upon the body or chassis of the automobile, and projects through an aperture 35 in the closed end of a tubular member 32.

The member 32 extends through the space between the wall 29 and the instrument panel 31 of the automobile, the outer end of the member being provided with a flange and a nut 34 operable to clamp the member to the panel. A projection 41 in the outer end of the tubular member 32 is adapted to enter any one of a plurality of serrations 36a provided in the lower edge of a bar 36 extending longitudinally of the member. The end of the cable 28 is fastened to the bar 36 by looping it through an aperture 38. A handle 37 mounted on the projecting end of the bar 36 is accessible to the driver of the automobile to enable him to move the cable 28 and thereby rotate the pulley 25 sufficiently to operatively engage the cam 24 with the shoe 12 and move the latter out of engagement with the piston 15 and into contact with the drum 11. The amount of movement of the bar 36 can be varied in accordance with the required braking pressure and the slack in the cable 28, and is adapted to be set for any required tension of the cable with the projection 41 in the corresponding serration 36a in the bar. The brake is released from operative engagement with the drum 11 by lifting the bar 36 out of contact with the projection 41 and pushing it back in the tubular member 32 to a position where the cable is no longer taut.

The device is shown as used in connection with the two driven rear wheels 42 of an automobile wherein a complete installation will preferably include only two of such devices each operatively connected with a different wheel to prevent spinning thereof when the automobile equipped therewith is stalled in mud or on a slippery road. Obviously the two devices do not interfere with the normal simultaneous operation of the brakes by a lever or the foot pedal 40, shown in Fig. 5. The devices are also adapted for use with trucks having four or more driven wheels in which case it is preferable to provide four of the independently controlled devices, one for each driven wheel.

Another embodiment of the invention is illustrated in Fig. 4 wherein the device shown is adapted as a brake to prevent spinning of a wheel controlled by a mechanical brake. The embodiment comprises a tubular member 32, a bar 36, a handle 37 and a cable 43 also similar in construction and operation to the members similarly numbered and shown in Fig. 1. The mechanical brake is shown diagrammatically as mounted on the rear axle 53 of an automobile, there being one of such brakes adjacent each driven rear wheel 42. Each mechanical brake includes a drum 52 and a pair of shoes 51 movable to engage the drum by contact therewith of a cam member 51 rotatable by the shaft 49. The cable 43 is connected with a rod 44 by a clamp 54 in a manner whereby movement of the cable moves the rod longitudinally. An arm 48 connects the rod 44 with the shaft 49 and movement of the rod thereby oscillates the shaft and cam. The driver by pulling on the handle 37 of either of the devices connected with the respective driven rear wheels 42 is enabled to operate the corresponding brake and stop spinning of the related wheel. A clevis 45, adapted to ride over a pin 46 operatively connects the rod 44 with the pedal actuated mechanism. The pin 46 is mounted on one end of a pivoted bar 47 forming part of the single control mechanism actuated by the pedal 40. In operating the brake by the independently controlled device, the clevis 45 slides over the pin 46 and the rod 44 is moved independently of the bar 47 and the other members comprising the pedal actuated mechanism.

A rod 44a is slidably connected with a pin 55, on the lower end of the bar 47. The front end of the rod 44a is adapted to be connected with a brake on the front axle (not shown) and is operable by the pedal 40 simultaneously with the other brakes. In the event the axle in front carries driven wheels, as is sometimes the case with large trucks, the rod 44a may be actuated independently through a control device connected therewith by cable 43 shown in Fig. 4 as fastened to the rod by a clamp 54.

Figs. 7 and 8 illustrate another embodiment of the invention wherein a flexible rod or wire 64 is operable to actuate a cam 72 into and out of operative engagement with the rim of a brake shoe 12. The device includes a member 32 mounted in the wall 29 and the instrument panel 31.

A plunger rod 63, longitudinally movable in the member 32, provides an aperture 73 at one end through which the adjacent end of the rod or wire 64 is looped. The rod 64 is encased with a spiral sheath or housing 65 having one end bearing against the member 32 and the other end fastened to a portion 66 of the body or chassis by means of a clamp 67.

The cam 72 is mounted on a shaft 62 carried by the brake supporting member 10. The shaft 62 is journalled in members 69 and 70 clamped on opposite sides of the member 10 by means of screws 71. The projecting end of the shaft 62 carries a lever 68 providing an aperture 74 through which the rod or wire 64 is looped.

The cam 72 is rotated into operative engagement with the rim of the brake 12 by pulling on the handle 37 and thereby actuating the lever 68. The frictional engagement of the rod or wire 64 with the sheath 65 holds the lever 68 and cam 72 in the position of operative engagement of the cam with the brake. The cam is released from engagement with the brake by pushing the handle 37 back to its initial position as shown in Fig. 7.

Thus it will be seen that I have provided a plurality of attachments each operable to independently actuate a brake operatively related to one of a plurality of driven wheels independently of their simultaneous actuation by a single pedal actuated control device, said devices when mounted on an automobile enabling the driver to check or stop the spinning of any driven wheel with which the attachments are respectively operatively related.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a vehicle having a plurality of traction wheels, individual brake mechanisms associated with each of said wheels, said brake mechanisms each comprising a drum movable with the wheel, a brake support and a shoe mounted on the support and movable to frictionally engage and disengage the drum, hydraulic mechanism operatively related to and operable to simultaneously actuate the shoes, a plurality of manually operable means each operatively related to one of said shoes, said manually operable means each consisting of a shaft rotatably mounted on said support, a spiral faced cam mounted on and operable by rotation of the shaft to operatively engage and disengage the shoe with the drum, a cable having one end connected with the shaft and operable by exerting a pull thereon to rotate the shaft and cause said cam to move the shoe into frictional contact with the drum, a handle member mounted on the other end of each cable, and means for maintaining said handle member in close proximity to the driver's seat.

2. In a vehicle having a plurality of traction wheels, individual brake mechanisms associated with each of said wheels, said brake mechanisms each comprising a drum movable with the wheels, brake support and a shoe mounted on the support and movable to frictionally engage and disengage the drum, mechanism operatively related to and operable to simultaneously actuate the shoes, a plurality of manually operable means each operatively related to one of said shoes, said manually operable means each consisting of a shaft rotatably mounted on said support, a spiral faced cam mounted on and operable by rotation of the shaft to operatively engage and disengage the shoe with the drum, a cable having one end connected with the shaft and operable by exerting a pull thereon to rotate the shaft and cause said cam to move the shoe into frictional contact with the drum, said cables terminating adjacent the driver's seat, a handle member mounted on each cable, and means for maintaining each handle member in a position accessible for operation from the driver's seat.

FRANK C. BAIRD.